(12) United States Patent
Kim

(10) Patent No.: US 8,172,979 B2
(45) Date of Patent: May 8, 2012

(54) POROUS ADHESIVE FOR CORRUGATED CARDBOARD AND METHOD OF MANUFACTURING CORRUGATED CARDBOARD USING THE SAME

(76) Inventor: Soosung Kim, Seoul (KR)

( * ) Notice: Subject to any disclaimer, the term of this patent is extended or adjusted under 35 U.S.C. 154(b) by 25 days.

(21) Appl. No.: 11/965,360

(22) Filed: Dec. 27, 2007

(65) Prior Publication Data

US 2008/0268224 A1 Oct. 30, 2008

(30) Foreign Application Priority Data

Apr. 26, 2007 (KR) .................. 10-2007-0040766

(51) Int. Cl.
| | |
|---|---|
| C09J 4/00 | (2006.01) |
| C09J 101/00 | (2006.01) |
| C09J 201/00 | (2006.01) |
| B31F 1/20 | (2006.01) |
| C08K 3/34 | (2006.01) |
| B32B 7/12 | (2006.01) |

(52) U.S. Cl. ..... 156/336; 156/210; 524/450; 428/317.5; 428/317.7

(58) Field of Classification Search .................. 156/336, 156/210; 524/450; 428/317.5, 317.7
See application file for complete search history.

(56) References Cited

U.S. PATENT DOCUMENTS

| | | | | |
|---|---|---|---|---|
| 4,014,727 A | * | 3/1977 | Musselman et al. | 156/205 |
| 4,092,175 A | * | 5/1978 | Martin | 134/42 |
| 4,495,011 A | * | 1/1985 | Scharfenberg et al. | 156/78 |
| 4,561,918 A | * | 12/1985 | Scharfenberg et al. | 156/78 |
| 4,941,922 A | * | 7/1990 | Snyder | 106/211.1 |
| 4,978,411 A | * | 12/1990 | Leake et al. | 156/336 |
| 5,114,509 A | * | 5/1992 | Johnston et al. | 156/73.1 |
| 5,181,959 A | * | 1/1993 | Nagai et al. | 106/215.3 |
| 5,435,958 A | * | 7/1995 | Dinnage et al. | 264/171.1 |
| 5,972,091 A | * | 10/1999 | Giesfeldt et al. | 106/126.1 |
| 6,063,178 A | * | 5/2000 | McPherson et al. | 106/163.01 |
| 6,093,282 A | * | 7/2000 | Ryu et al. | 162/4 |
| 6,228,158 B1 | * | 5/2001 | Skuratowicz | 106/208.1 |
| 6,238,504 B1 | * | 5/2001 | Simmons et al. | 156/78 |

(Continued)

FOREIGN PATENT DOCUMENTS

JP  2000355682 A  * 12/2000

(Continued)

OTHER PUBLICATIONS

Machine translation of KR20020023800A, 2010.*

Primary Examiner — Liam Heincer
(74) Attorney, Agent, or Firm — Frost Brown Todd LLC

(57) ABSTRACT

Disclosed is a porous adhesive for corrugated cardboard, including sticky starch and porous zeolite, in which microscopic holes to be joined with the microscopic holes in zeolite are formed in starch, thereby maintaining the freshness of food products stored in a corrugated cardboard box and efficiently eliminating remaining agricultural chemical components. Also, a method of manufacturing corrugated cardboard using the porous adhesive is provided. The porous adhesive for corrugated cardboard is obtained by blending a mixture, including 68.5~79.5 wt % corn starch, 20~30 wt % zeolite powder having the same particle size to that of the corn starch, and 0.5~2 wt % microorganism-containing yellow soil, caustic soda and a hardener, with water. The zeolite powder and the corn starch have a particle size of 300~350 meshes. The microorganisms contained in yellow soil are selected from the group consisting of *Bacillus* sp., *Acinetobacter* sp., *Pseudomonas* sp., and mixtures thereof.

5 Claims, 6 Drawing Sheets

U.S. PATENT DOCUMENTS

| | | | |
|---|---|---|---|
| 6,648,955 B1* | 11/2003 | Swiezkowski et al. | 106/211.1 |
| 6,875,299 B1* | 4/2005 | Vangbo | 156/208 |
| 7,196,122 B2* | 3/2007 | Ryoo et al. | 523/218 |
| 2003/0051637 A1* | 3/2003 | Klass | 106/483 |
| 2004/0108042 A1* | 6/2004 | Affentranger | 156/153 |
| 2004/0241382 A1* | 12/2004 | Bloembergen et al. | 428/72 |
| 2005/0039869 A1* | 2/2005 | Franks et al. | 162/5 |
| 2009/0025553 A1* | 1/2009 | Keefer et al. | 95/96 |

FOREIGN PATENT DOCUMENTS

| | | | |
|---|---|---|---|
| JP | 2000355683 A | * | 12/2000 |
| KR | 20020023800 A | * | 3/2002 |

* cited by examiner

POROUS ADHESIVE FOR CORRUGATED CARDBOARD AND METHOD OF MANUFACTURING CORRUGATED CARDBOARD USING THE SAME

FIELD OF INVENTION

The present invention relates to a porous adhesive for corrugated cardboard and a method of manufacturing corrugated cardboard using the same, and, particularly, to a porous adhesive for corrugated cardboard, including sticky starch and porous zeolite, in which microscopic holes to be joined with the microscopic holes in zeolite are formed in starch, thereby maintaining the freshness of food products stored in a corrugated cardboard box and efficiently eliminating remaining agricultural chemical components, and to a method of manufacturing corrugated cardboard using the same.

BACKGROUND

Generally, corrugated cardboard, produced by attaching liner sheets to both sides of a corrugated sheet using an adhesive to thus increase cushioning ability, is mainly used in the manufacture of product-packaging boxes. However, because a packaging box made of conventional corrugated cardboard plays only a simple role in preventing damage to products stored in the box due to the cushioning ability of the corrugated cardboard, it is difficult to use it to maintain the freshness of various natural food products stored in the box, including agricultural products, livestock products, marine products and forest products, for a long period of time, or to absorb and eliminate pungent odors emitted by the products. Further, these days, agricultural chemicals are used in large amounts to kill harmful insects or remove weeds in the course of cultivation of agricultural products, and thus agricultural chemical components may remain on the crops, undesirably negatively affecting human bodies. Accordingly, there is urgently required a packaging box that is able to naturally neutralize and remove remaining toxic agricultural chemical components when agricultural products are packaged in boxes.

In this regard, there have been proposed methods of manufacturing a functional corrugated cardboard box by adding sticky starch with zeolite powder, having microscopic holes 1 nm or less in size and serving as an adsorbent, an ion exchanger, and a dehydrating agent.

However, in the adhesive for functional corrugated cardboard according to such a conventional technique, as seen in FIG. 1, the particle size of zeolite powder 110 is larger than that of starch 120, and thus the zeolite powder 110 is easily separated in the course of usage. The zeolite powder 110, which is separated from the adhesive, is not harmful to the human body, but feels dirty to consumers.

In order to solve this problem, attempts to control the particle size of the zeolite powder 110 so that it is the same as that of the starch 120 have been devised. In this case, however, the zeolite powder 110 is completely enclosed with the starch 120, thereby closing the microscopic holes in zeolite, making it impossible to exhibit high absorption capability and anion exchange capability. Accordingly, the functions of the adhesive for neutralizing and removing remaining toxic agricultural chemical components or efficiently discharging such components are drastically decreased.

SUMMARY

Accordingly, the present invention has been made keeping in mind the above problems occurring in the related art, and provides a porous adhesive for corrugated cardboard, including sticky starch and porous zeolite, in which microscopic holes to be joined with the microscopic holes in zeolite are formed in corn starch using soil microorganisms, thereby maintaining the freshness of food products stored in a corrugated cardboard box and efficiently eliminating remaining agricultural chemical components, and also a method of manufacturing corrugated cardboard using the same.

According to a first embodiment of the present invention, a porous adhesive for corrugated cardboard may be obtained by blending a mixture, including 68.5~79.5 wt % corn starch, 20~30 wt % zeolite powder having the same particle size to that of the corn starch, and 0.5~2 wt % microorganism-containing yellow soil, caustic soda and a hardener, with water.

According to a second embodiment of the present invention, a porous adhesive for corrugated cardboard may be obtained by blending a mixture, including 68.5~79.5 wt % corn starch, 20~30 wt % zeolite powder having the same particle size to that of the corn starch, and 0.5~2 wt % microorganisms, caustic soda and a hardener, with a predetermined amount of water.

The corn starch and the zeolite powder preferably have a particle size of 300~350 meshes.

The microorganisms may be selected from the group consisting of *Bacillus* sp., *Acinetobacter* sp., *Pseudomonas* sp., and mixtures thereof.

The adhesive mixture may be blended with water such that the viscosity of the mixture permits dripping.

In addition, according to the present invention, a method of manufacturing corrugated cardboard may include preparing the above-mentioned porous adhesive for corrugated cardboard; applying the adhesive for corrugated cardboard on an upper liner sheet and a lower liner sheet or on a corrugated sheet, said sheets constituting the corrugated cardboard; sequentially laminating the lower liner sheet, the corrugated sheet, and the upper liner sheet to obtain a corrugated cardboard laminate, which is then compressed using a pair of rollers, thus manufacturing the corrugated cardboard; and aging the corrugated cardboard under temperature and humidity conditions suitable for the growth of the microorganisms contained in the adhesive, thus forming microscopic holes in the corn starch.

The pair of rollers, used when manufacturing the corrugated cardboard, may have a surface temperature of 100° C. or less.

The aging of the corrugated cardboard may be conducted at 15~40° C. and 20~70%.

The method of the present invention may further include subjecting the corrugated cardboard to dry heating at 65° C. or higher for 30 min or longer to thus kill the microorganisms contained in the adhesive, after aging the corrugated cardboard.

DETAILED DESCRIPTION OF THE PREFERRED EMBODIMENTS

Hereinafter, a detailed description will be given of a porous adhesive for corrugated cardboard and a method of manufacturing corrugated cardboard using the same, according to the present invention, with reference to the appended drawings.

Figure 1:
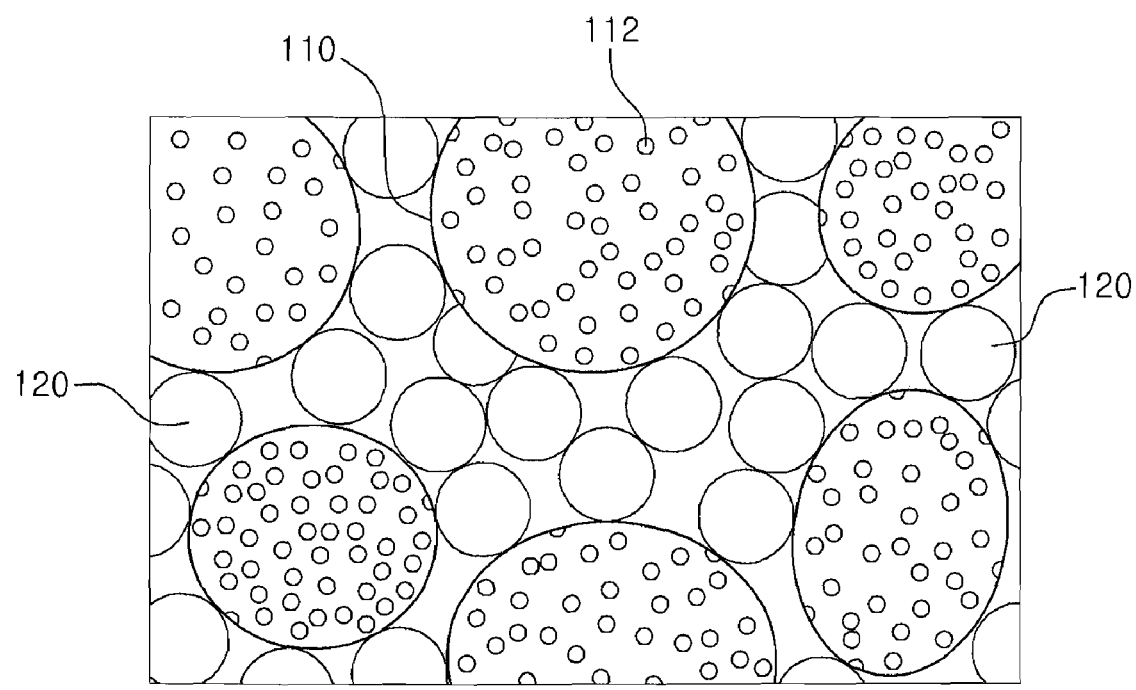
FIG. 1 is a schematic view illustrating a conventional adhesive for corrugated cardboard, in which zeolite and starch are mixed together.
Figure 2:
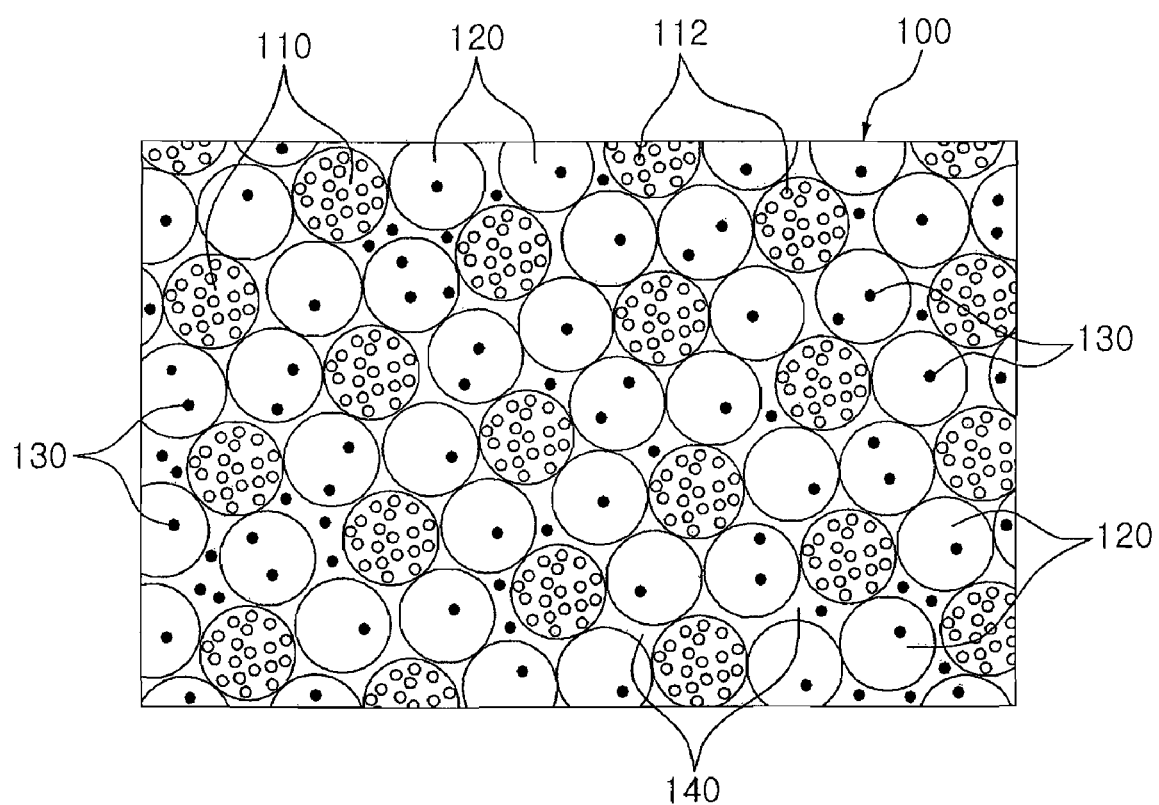
FIG. 2 is a schematic view illustrating a porous adhesive for corrugated cardboard, in which zeolite, starch, and microorganisms are mixed together, according to the present invention.

FIG. 2 is a schematic view illustrating a porous adhesive for corrugated cardboard according to the present invention, which includes zeolite powder 110, starch 120, and microorganisms 130. As illustrated in FIG. 2, the porous adhesive 100 for corrugated cardboard according to the present invention is formed by mixing the zeolite powder 110, the starch 120, and the microorganisms 130 with a predetermined amount of water.

In the present invention, the starch 120 and the zeolite powder 110 preferably have the same particle size, for example, a particle size of 300~350 meshes. As such, the term "mesh", which is a unit indicating a sieve opening or a particle size, is defined as the number of openings per linear inch in a Tyler standard sieve.

The starch is flour which is produced from corn, sweet potatoes, or potatoes, and precipitates in water. In particular, corn starch has high absorption capability and penetrability and thus is mainly used as material for processed food products. Accordingly, in the porous adhesive for corrugated cardboard according to the present invention, the use of corn starch 120 is preferable. The corn starch is used in an amount of 68.5~79.5 wt %, and preferably 74 wt %, the zeolite powder is used in an amount of 20~30 wt %, and preferably 25 wt %, and microorganisms, caustic soda, and a hardener are used in an amount of 0.5~2 wt %, and preferably 1 wt %.

As the microorganisms, useful are microorganisms which can grow under aerobic and non-oxygen conditions and can highly degrade carbohydrates contained in the starch. Such microorganisms, which are separated from yellow soil (the number of microorganisms in 1 g of yellow soil is two hundred million or more) from the top layer of soil, may be selected from the group consisting of *Bacillus* sp., *Acinetobacter* sp., *Pseudomonas* sp., and mixtures thereof.

The soil microorganisms are obtained in a manner such that hard-boiled rice (or culture broth) is placed in a wide-mouth container, covered with yellow soil from the top layer of soil, and then incubated in an incubator at about 37° C. for 24 hours, after which the bacteria-grown hard-boiled rice thus incubated is inoculated into a TB (Thioglycolate Broth) medium available from BBL, subjected to seed culture in an incubator at about 37° C. for 24 hours, transferred into a blood agar plate or a MacConkey agar plate, and then incubated at 37° C. for 18 hours.

As seen in FIG. 2, microorganisms may be separated from soil, incubated and then mixed, or alternatively, soil microorganism-containing yellow soil may be pulverized to a particle size which is the same as or smaller than the particle size of starch, and then directly mixed.

Subsequently, the above mixture is added with a predetermined amount of water 140 such that the viscosity of the mixture permits dripping, with uniformly stirring, thus completing the porous adhesive 100 for corrugated cardboard according to the present invention.

Figure 3:
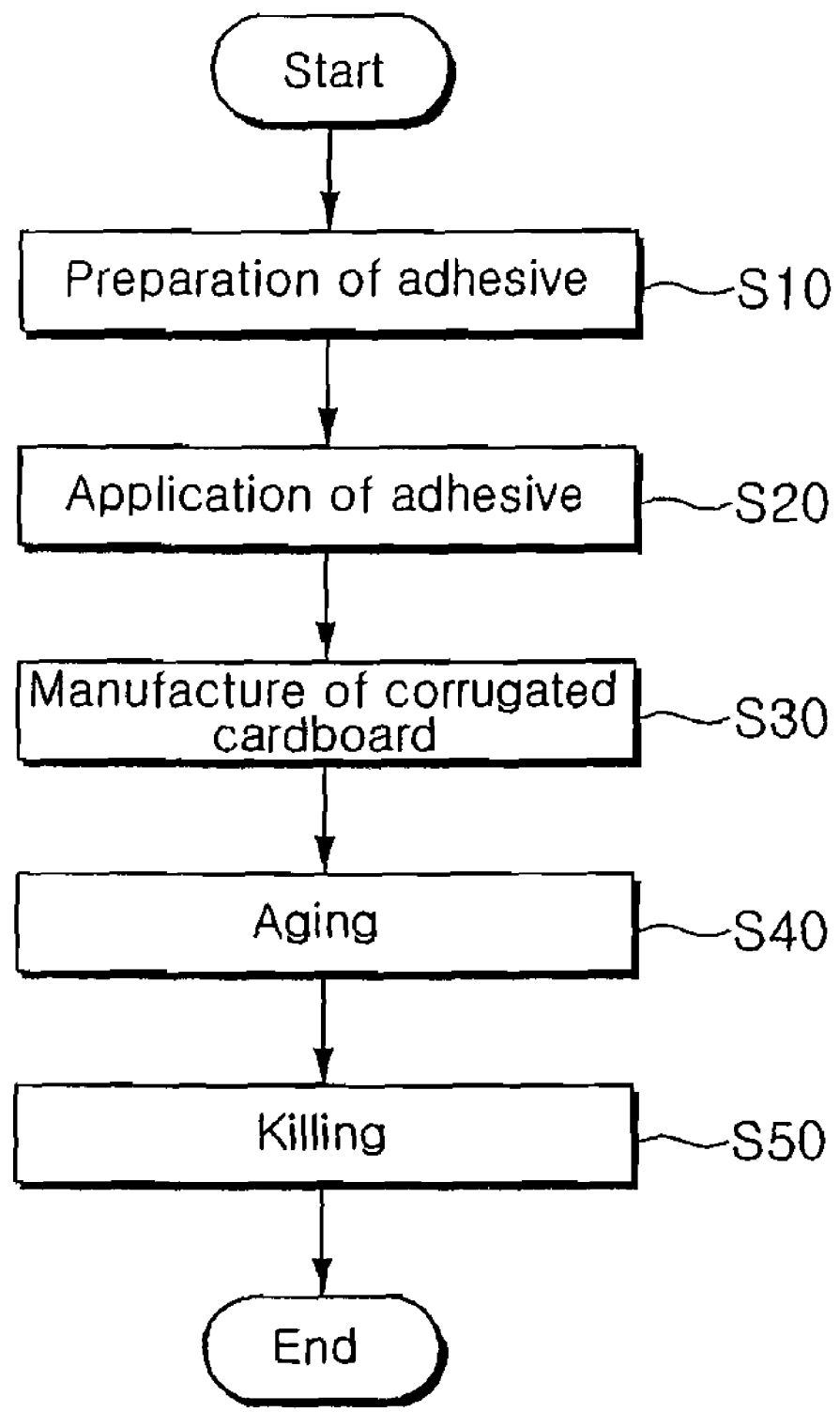
FIG. 3 is a flowchart illustrating the process of manufacturing corrugated cardboard using the porous adhesive for corrugated cardboard, according to the present invention.
Figure 4:
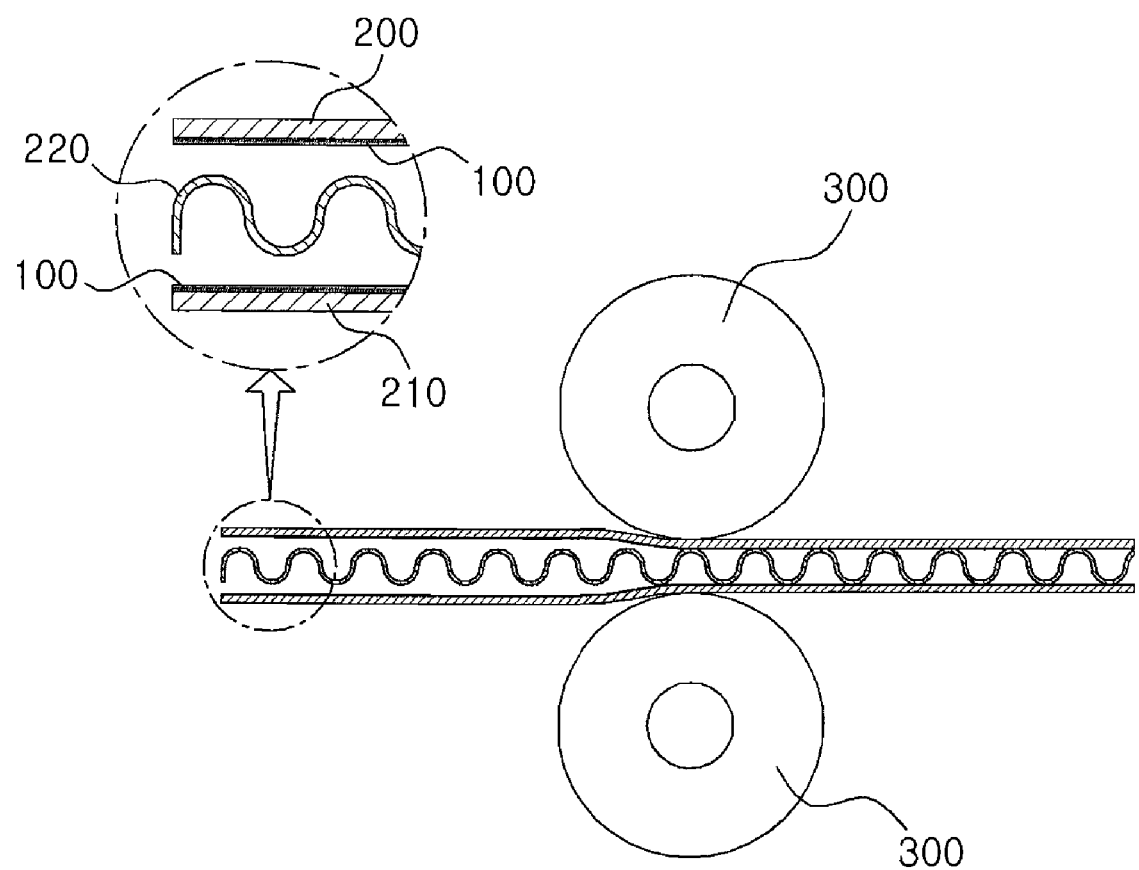
FIG. 4 is a sectional view illustrating the process of bonding the sheets of the corrugated cardboard using the porous adhesive for corrugated cardboard, according to the present invention.

FIG. 3 is a flowchart illustrating the process of manufacturing the corrugated cardboard using the porous adhesive for corrugated cardboard, according to the present invention, and FIG. 4 is a sectional view illustrating the process of bonding the sheets of the corrugated cardboard using the adhesive according to the present invention.

As illustrated in FIG. 3, at step S10, the above-mentioned mixture is added with a predetermined amount of water, with uniformly stirring, thus preparing the adhesive 100. At step S20, the adhesive 100 thus prepared is uniformly applied on an upper liner sheet 200 and a lower liner sheet 210 or on a corrugated sheet 220, said sheets constituting the corrugated cardboard. At step S30, as seen in FIG. 4, the lower liner sheet 210, the corrugated sheet 220, and the upper liner sheet 200, which are coated with the adhesive 100, are sequentially laminated to thus obtain a corrugated cardboard laminate, which is then passed through a pair of rollers 300, thereby bonding the sheets of the corrugated cardboard. As such, the surface of the roller 300 may be heated to a predetermined temperature to realize rapid adhesion of the adhesive 100. In the present invention, the surface of the roller 300 may be heated to 100° C. or less, in order to prevent the microorganisms 130 contained in the adhesive 100 from being killed. Further, the corrugated cardboard laminate should be passed through the pair of rollers 300 so that respective portions thereof are brought into contact with the rollers only for a short time of 2 seconds or less.

Subsequently, at step S40, the corrugated cardboard thus obtained is allowed to stand in a predetermined atmosphere, for example, at a temperature of 15~40° C. and at a humidity of 20~70%, for a predetermined period of time, for example, for 24 hours or longer, thus growing the microorganisms contained in the adhesive. After the manufacture of the corrugated cardboard at step S30, the adhesive 100 has viscosity such that it is not completely dry, but is sticky. Thus, when predetermined temperature and humidity conditions are maintained, the microorganisms or spores thereof, which live in the adhesive 100, are activated and metabolized using the starch. Through the metabolism of the microorganisms, microscopic holes, including through holes or grooves caused by partial breakdown, are formed in the corn starch surrounding the zeolite particles, so that the microscopic holes in the zeolite communicate with external air. Such microscopic holes, communicating with external air, act as a path by which zeolite can absorb ethylene or volatile agricultural chemical components from vegetables.

After the predetermined period of time, the dry state is created and maintained to completely dry the adhesive 100, which thereby prevents a decrease in the adhesive force due to the formation of too many microscopic holes in the corn starch in the case where the microorganisms are continuously proliferated under appropriate microorganism growth conditions. In this way, after the drying process, the manufacture of the corrugated cardboard is completed.

Moreover, in the case where there are worries about the excessive proliferation of microorganisms, dry heating of the corrugated cardboard may be further conducted under predetermined conditions, for example, 65° C. or higher and 30 min or longer, to thus kill the microorganisms, at step S50, after aging the corrugated cardboard at step S40, if necessary. Alternatively, the microorganisms may be killed using another means, such as UV light.

Figure 5:
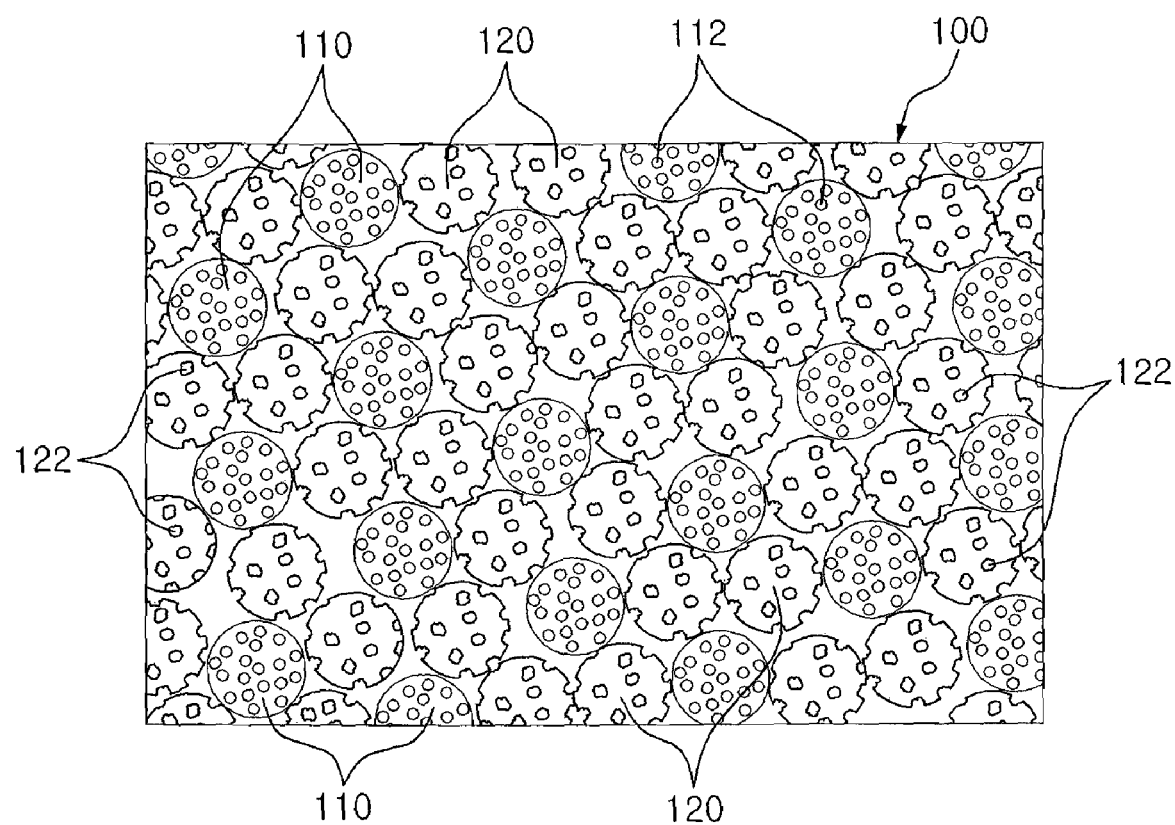
FIG. 5 is a schematic view illustrating the porous adhesive for corrugated cardboard, in which microscopic holes to be joined with zeolite are formed in starch using microorganisms, according to the present invention.

FIG. 5 is a schematic view illustrating the porous adhesive for corrugated cardboard according to the present invention, in which the microscopic holes to be joined with zeolite are formed in the starch using the microorganisms. In the drawing, the starch is illustrated as having a circular shape for the convenience of description, but is actually in the form of a layer which surrounds the zeolite particles.

As seen in FIG. 5, in the porous adhesive 100 for corrugated cardboard according to the present invention, a plurality of the microscopic holes 122 to be joined with the microscopic holes 112 in the zeolite powder 110 is formed in the corn starch 120 using the microorganisms. In the drawing, the microscopic holes 122 formed in the corn starch 120 are shown as having a circular shape, but actually have a somewhat irregular three-dimensional structure. Thus, the microscopic holes 112 in the zeolite powder 110, which communicate with such three-dimensional microscopic holes 122, may easily communicate with external air. Such microscopic holes 112, 122 are responsible for absorbing ethylene or remaining volatile agricultural chemical components from the inside of the box.

Figure 6:
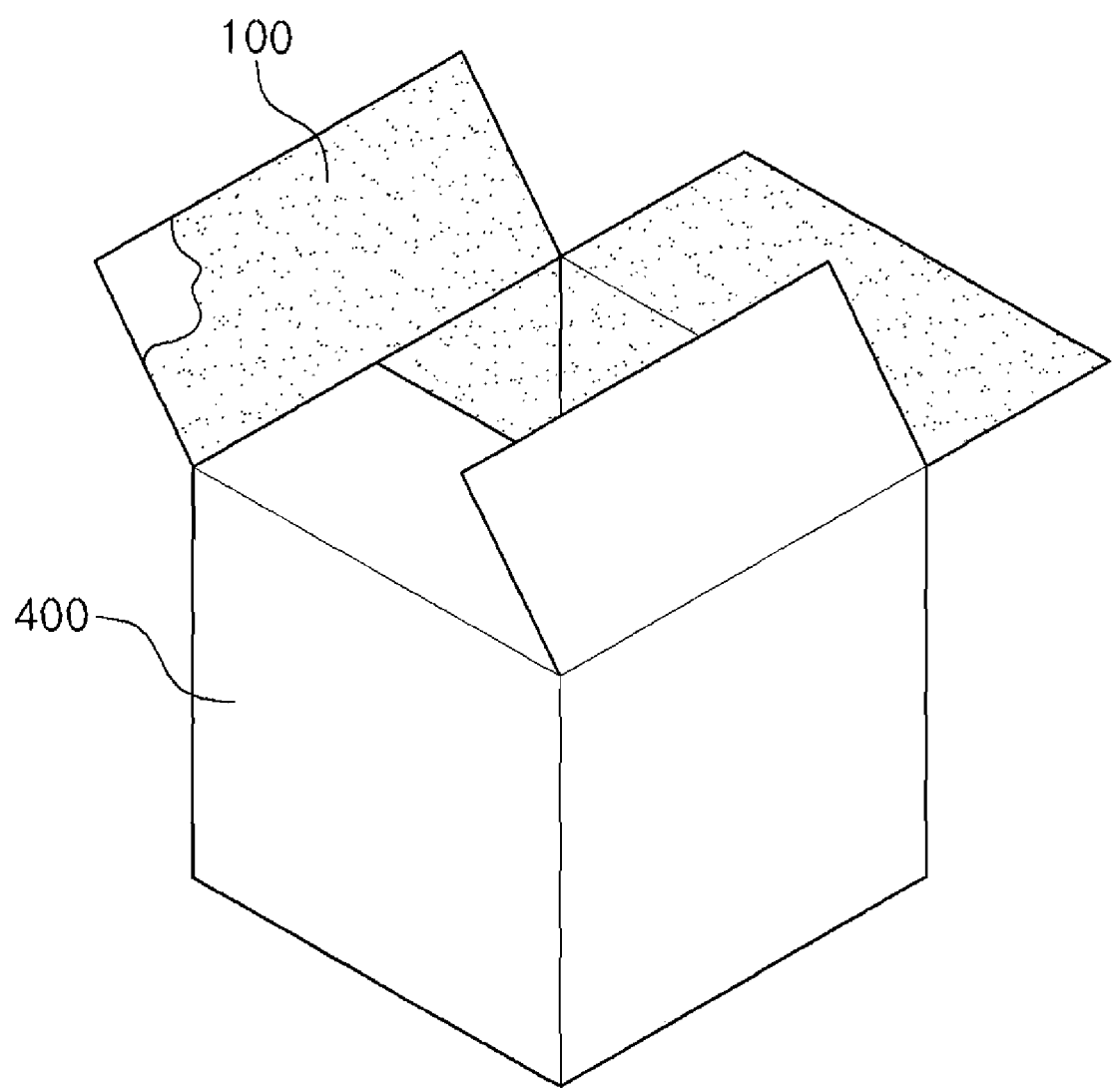
FIG. 6 is a perspective view illustrating a packaging box, which is coated with the porous adhesive for corrugated cardboard, according to the present invention.

In addition to the manufacture of the corrugated cardboard, the porous adhesive for corrugated cardboard according to the present invention may be applied on the inner surface of a packaging box 400, thus exhibiting the same effects as seen in FIG. 6.

As described hereinbefore, the present invention provides a porous adhesive for corrugated cardboard and a method of manufacturing corrugated cardboard using the same. According to the present invention, in the adhesive for corrugated cardboard, which includes starch and porous zeolite, a plurality of microscopic holes to be joined with the microscopic holes in zeolite is formed in starch, thereby maintaining the freshness of food products stored in a corrugated cardboard box and efficiently eliminating remaining agricultural chemical components.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of manufacturing corrugated cardboard using a porous adhesive for corrugated cardboard, comprising:
   preparing a mixture, including 68.5~79.5 wt % starch, 20~30 wt % zeolite powder having substantially the same particle size to that of the starch, and 0.5~2 wt % of a total of microorganisms, caustic soda and a hardener;
   adding the mixture with water to obtain the porous adhesive for corrugated cardboard;
   applying the porous adhesive for corrugated cardboard on an upper liner sheet and a lower liner sheet or on a corrugated sheet, the upper liner sheet, the lower liner sheet and the corrugated sheet comprising the corrugated cardboard;
   laminating the lower liner sheet, the corrugated sheet, and the upper liner sheet to obtain a corrugated cardboard laminate;
   compressing the corrugated cardboard laminate to obtain the corrugated cardboard; and
   storing the corrugated cardboard under a microorganism growth condition so that a plurality of microscopic holes are formed in the starch.

2. The method as set forth in claim 1, wherein the corrugated cardboard laminate is compressed with a pair of rollers and the pair of rollers has a surface temperature of 100° C. or less.

3. The method as set forth in claim 1, further comprising:
   subjecting the corrugated cardboard to a condition to kill the microorganisms therein, after storing the corrugated cardboard.

4. The method as set forth in claim 1, wherein the zeolite powder has a particle size of 300~350 meshes.

5. The method as set forth in claim 1, wherein the microorganisms are selected from a group comprising *Bacillus* sp., *Acinetobacter* sp., *Pseudomonas* sp., and mixtures thereof.

* * * * *